Dec. 19, 1961   J. O. BEAUMONT   3,014,210
DEVICES EMPLOYING THE PRECESSION RESONANCE
OF PARAMAGNETIC MEDIA
Filed May 31, 1951   3 Sheets-Sheet 1

INVENTOR.
JAMES O. BEAUMONT.

Dec. 19, 1961   J. O. BEAUMONT   3,014,210
DEVICES EMPLOYING THE PRECESSION RESONANCE
OF PARAMAGNETIC MEDIA
Filed May 31, 1951   3 Sheets-Sheet 2
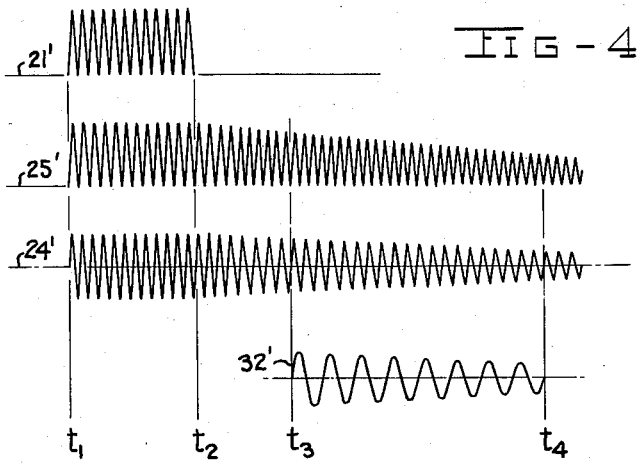
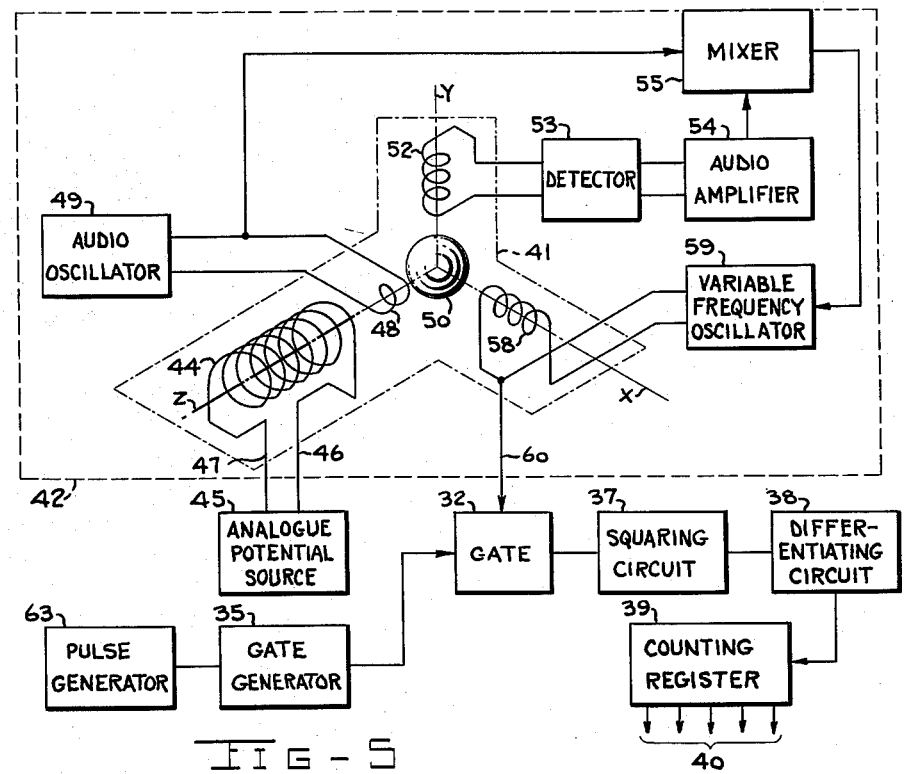
INVENTOR.
JAMES O. BEAUMONT.

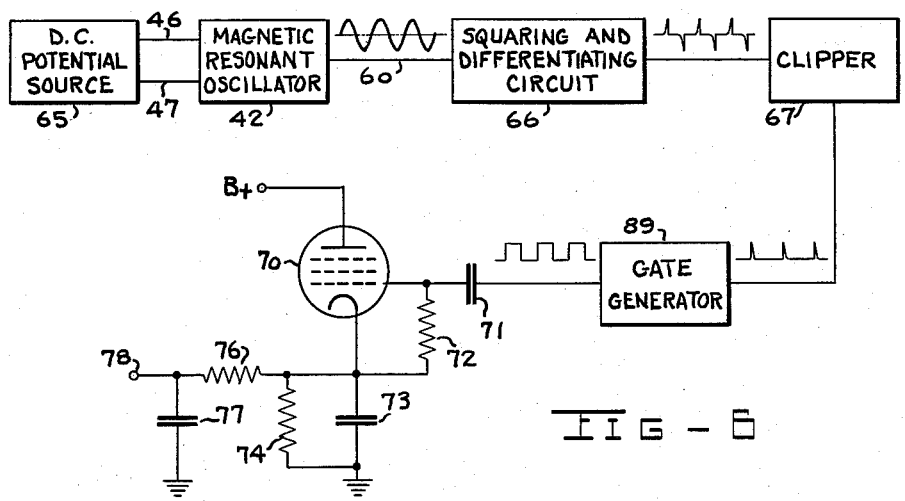
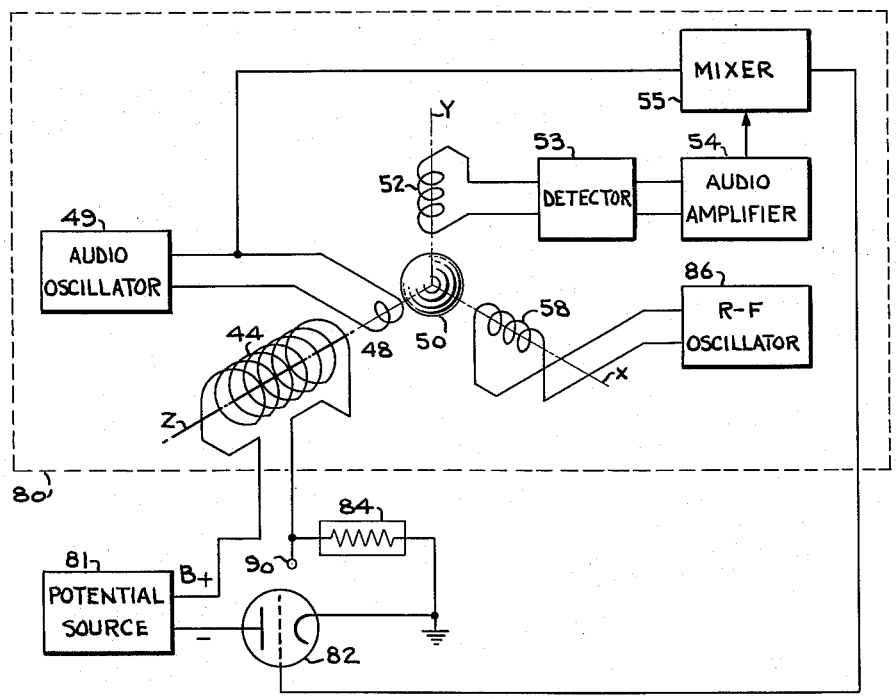

3,014,210
**DEVICES EMPLOYING THE PRECESSION RESO-
NANCE OF PARAMAGNETIC MEDIA**
James O. Beaumont, Los Angeles, Calif., assignor, by
mesne assignments, to Hughes Aircraft Company, a
corporation of Delaware
Filed May 31, 1951, Ser. No. 229,184
3 Claims. (Cl. 340—347)

This invention relates to devices utilizing the Larmor precession resonant frequency of paramagnetic substances, and, more particularly, to devices which utilize the conversion of a given magnetic flux into a precise frequency related thereto by precession of nuclear and atomic moments of paramagnetic substances under subjection to the flux field.

It has been found that the nuclei of paramagnetic materials possess proton or nuclear magnetic moments, and if these nuclei are subjected to a steady state magnetic flux field, the magnetic moments of the nuclei will orient in a direction parallel to the flux field. If the substances are then subjected to a magnetic force couple produced by a high frequency magnetic field directed at right angles to the steady state flux field, a precession of their nuclei takes place, similar in manner to the precession of a gyroscope. This precession may be converted into a signal by placing a pick-up or receiver coil at right angles to both the steady state flux field and the driving high frequency field. The frequency of the precession signal is always equal to the frequency of the driving magnetic force couple produced by the high frequency magnetic field, but the amplitude of the precession signal is a quantity determined by the material, the magnitude of the steady flux field intercepting the substance and the frequency and amplitude of the driving high frequency flux field. If, for example, the driving field frequency were varied while maintaining the steady flux field at a constant value, a resonance condition would be observed in the magnitude of the nuclear precession signal at a given driving frequency. If the flux field were then placed at a second constant value and the driving frequency once again varied, another resonance condition of precession magnitude would be observed, but at a different driving frequency than that observed in the first instance. This resonant frequency of the nuclear magnetic moments, termed the Larmor precession resonant frequency, has been determined to be directly proportional to the magnitude of the steady state flux field, and this proportionality is observable over a wide range of flux magnitudes.

Another resonant precession phenomena similar to the nuclear induction noted above, is obtainable by utilizing the electron or atomic shell magnetic moments of a paramagnetic substance. The production of this atomic shell resonance is effected in the identical manner noted above except that the steady flux field necessary to observe the precession of the electron moments is of the order of only one-thousandth as much needed for a comparable couple undergoing nuclear induction. Another difference between atomic and nuclear induction is that the resonant frequency of atomic induction will possess substantially a million times greater signal-to-noise ratio than nuclear induction for a comparable sample. This much smaller flux field and greater signal-to-noise ratio make the utilization of electron resonance much more attractive than nuclear resonance in many applications serving to correlate the resonant precession frequency to flux magnitudes.

The resonant precession frequency of a paramagnetic substance, regardless of whether its nuclear or atomic magnetic moment is used for obtaining resonance, is an extremely stable one for any steady state constant flux value, since it is determined by the substantially invariant qualities and characteristics of nuclear and atomic structure. Inasmuch as it is possible to obtain a flux field directly proportional to the current passing through a coil, it is clear that by utilizing the principle of Larmor precession, one may obtain a frequency exactly proportional to a given current or voltage.

This invention contemplates utilizing this factor of proportionality between potential and frequency of magnetic induction in a novel manner to accomplish, in its embodiment, an accuracy heretofore unknown in the art of potential-to-frequency conversion and frequency-to-potential conversion. More particularly, two embodiments of this invention utilize the Larmor precession resonant frequency characteristic of paramagnetic media to effect an accurate and stable analogue-to-digital conversion. One of these embodiments makes use of a further inherent characteristic of paramagnetic resonance in that once the high frequency driving field is removed from the steady state flux field, the atomic or nuclear precession does not cease abruptly, but, instead, decays slowly in amplitude at a rate dependent upon the particular paramagnetic substance employed. In addition, if the high frequency drive signal has a frequency other than the inherent resonant frequency of the media for a given steady state flux, than upon cessation of the driving field, the amplitude of the precession signal decays and its frequency, in accordance with conventional resonance phenomenon, changes from the drive signal frequency to the inherent resonant frequency of the media for the remaining portion of the decay time.

Another embodiment of this invention also utilizes the inherent stability of the voltage-to-frequency conversion property of nuclei or atomic magnetic induction to provide an extremely stable voltage suitable for use as a voltage standard. This voltage stability is primarily limited by the frequency stability of a R-F oscillator, which, as is well known, may be made extremely stable. Another embodiment serves as a direct current amplifier by employing the principles of Larmor precession resonance.

It is, therefore, an object of this invention to provide devices which, by employing the precession resonance of either the nuclei or atomic magnetic moments of paramagnetic substances, provide an extremely accurate proportionality between current or potential and frequency.

A further object of this invention is to provide a device utilizing Larmor precession of paramagnetic substances to convert a given analogue potential quantity into a corresponding binary digital number.

A still further object of this invention is to provide a device employing the precession relaxation time of either atomic or nuclear magnetic moments of a paramagnetic material to effect the conversion of an analogue potential, which, in the first instance, determined the resonant frequency of the decaying precession, into a digital number produced by counting, for a given time interval, the cycles of the resonant decay frequency.

Another object of this invention is to provide an analogue-to-digital converter which converts an analogue potential into an equivalent proportional resonant precession frequency of a paramagnetic substance, and then counts the cycles of the resonant frequency for a predetermined time interval to produce a digital number output corresponding to the analogue potential.

A still further object of this invention is to provide a device which converts a D.-C. potential into a resonant precession frequency of a paramagnetic body exactly proportional thereto by magnetic induction and which then effects a summation of the frequency output to produce an amplified D.-C. output potential.

Another object of this invention is to provide a device which utilizes the stability of precession frequency of a paramagnetic material and its corresponding relationship with a given steady flux field to produce a constant stable current and thereby provide a voltage output proportional to the current.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

FIG. 4 is a schematic diagram of waveforms illustrating the operation of the converter shown in FIG. 3;

FIG. 5 is a schematic diagram of another form of an analogue-to-digital converter according to this invention;

FIG. 6 is a schematic diagram of a D.-C. amplifier according to this invention;

FIG. 7 is a schematic diagram of a voltage standard according to this invention.

Figure 1:
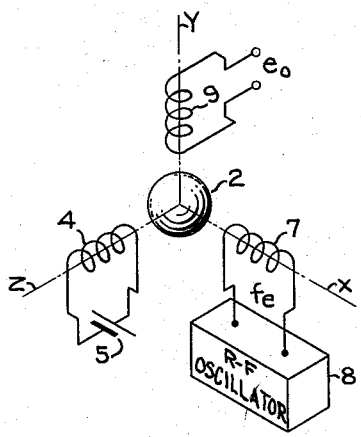
FIG. 1 is a schematic diagram of a simple magnetic induction unit.

Referring now to the drawings, there is shown in FIG. 1 a typical precession induction unit utilizing the Larmor precession frequency of a paramagnetic substance for obtaining a sharply resonant circuit. This unit is illustrated and described so that the principles observable in its operation will be apparent when it, in substance, is incorporated in the embodiments of this invention to be disclosed. The apparatus consists of a homogeneous body 2 of paramagnetic material lying at the imaginary point of intersection of three mutually perpendicular axes, $x$, $y$, and $z$, respectively, which constitute a conventional representation of the three-dimensional rectangular coordinate system. A static field coil 4, whose axis is in alignment with the $z$-axis, is connected to a battery 5 and produces a constant and uniform flux field, parallel to the $z$-axis, which envelops body 2. This flux acts upon substance 2 in a manner such that the magnetic moments thereof tend to orientate themselves parallel to the lines of force of the flux pattern along the $z$-axis. A transmitter coil 7 is aligned along the $x$-axis and is coupled to an R-F oscillator 8, the resultant R-F magnetic driving field being directed at right angles to the flux lines produced by coil 4. Under this condition, the magnetic moments of paramagnetic body 2 will begin Larmor precession by reason of their being subjected to the force couple produced by the interaction of the two fields. This Larmor precession will produce a potential having the same frequency as the R-F driving frequency of oscillator 8 across a receiver coil 9 whose axis is aligned along the $y$-axis. The relative magnitude of the potential output produced by coil 9, at any given instant, is a function of the steady state flux produced by coil 4 which envelops body 2, the R-F output frequency of oscillator 8, and the paramagnetic substance constituting body 2.

Figure 2:
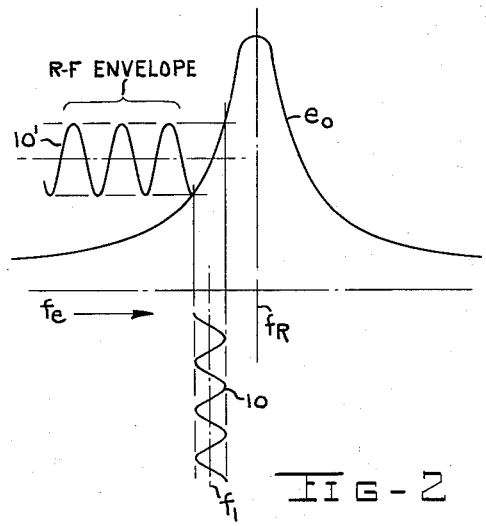
FIG. 2 is a curve associated with FIGS. 1 and 5.

Referring now to FIG. 2, there is shown a waveform illustrating the magnetic resonance effect obtained by varying the output frequency of R-F oscillator 8 while maintaining a constant flux from coil 4. Voltage $e_0$, in FIG. 2, which is the output potential produced across coil 9, is the relative output potential of the device and indicates that the body 2 of paramagnetic material exhibits a definite precession resonant frequency at one point, $f_R$, of applied R-F frequency and one value of steady-state. This resonant frequency may be varied by changing the amount of steady-state flux applied across the paramagnetic material, the resulting change of resonant frequency being directly proportional to the change in flux, this proportionality being observable over a large flux range.

Figure 3:
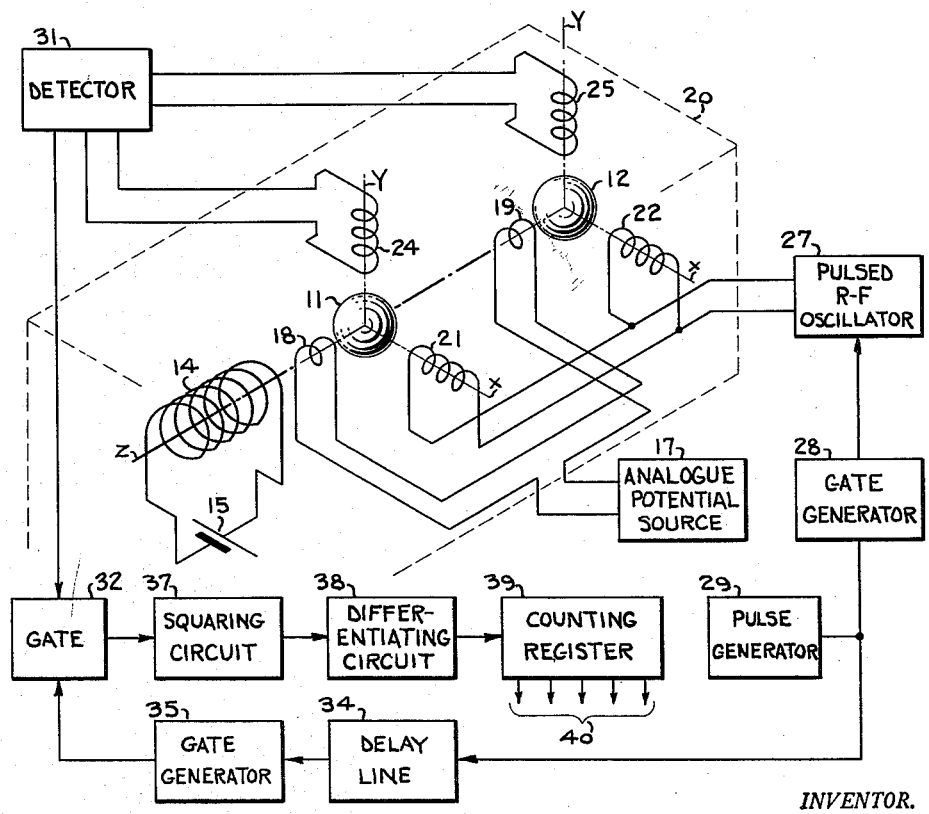
FIG. 3 is a schematic diagram of one form of analogue-to-digital converter, according to this invention.

Referring now to FIG. 3, there is shown one embodiment of this invention, employing a precession induction unit by which an analogue potential may be converted into a digital number. An induction unit 20 contains two identical paramagnetic bodies 11 and 12, respectively, which are enveloped by a steady magnetic field produced by a main static coil 14 connected across a source of direct-current potential such as battery 15. The static flux field produced by coil 14 must be extremely uniform and of constant intensity in the region of both paramagnetic bodies so as to produce an equal effect on the precession resonant frequencies thereof. The analogue potential to be converted is applied from a source 17 to two serially connected identical subsidiary or analogue field coils 18 and 19, adjacent paramagnetic bodies 11 and 12, respectively. The axes of coils 18 and 19 are in alignment with the axis of coil 14, and the coils themeslves are electrically connected in reverse directions so that their flux paths, both equal and both lying within the general flux field of coil 14, oppose one another in direction but are active and effective only in the immediate region of their respective associated paramagnetic bodies. The connection of coil 18 is such that its flux is directed opposite to the flux produced by coil 14, and, by reason of its proximity to body 11, cancels out an amount of flux equal to its field strength from the flux of coil 14 originally enveloping coil 18. On the other hand, by reason of the reverse connection of coil 19, the flux thereof adds to the flux from coil 14 in the space surrounding paramagnetic body 12 and subjects body 12 to the sum of its flux plus the original flux from coil 14. Under this condition, body 11 will have one Larmor precession resonant frequency, proportional to the flux from coil 14 minus the flux from coil 18, while body 12 will have another resonant frequency proportional to the flux from coil 14 plus the flux from coil 19.

Two transmitting coils 21 and 22 are placed in proximity to bodies 11 and 12, respectively, and their axes are parallel to one another and are mutually perpendicular to the static flux path of coil 14 in the manner as was illustrated for transmitter coil 7 in FIG. 1. Two receiver or detector coils 24 and 25 are also aligned parallel to one another and are associated with bodies 11 and 12, respectively, in the manner described for receiver coil 9 of FIG. 1 in association with body 2.

Transmitter or radio-frequency coils 21 and 22 are connected in parallel to the output of a pulsed radio frequency oscillator 27 which in turn is actuated by a gate pulse received from a gating generator 28. Oscillator 27 produces an R-F frequency output signal having a frequency of the general order of magnitude of the resonant frequencies of bodies 11 and 12 as subjected to the flux quantities set forth above. Upon the receipt of a gating pulse, oscillator 27 produces a pulse of R-F power across coils 21 and 22 which lasts for an interval between $t_1$ and $t_2$, as illustrated by curve 21' of FIG. 4. The resultant magnetic couple placed on bodies 11 and 12 by the power pulse in these transmitting coils produces, by Larmor precession, potentials in receiving coils 24 and 25, of the same frequency as that in coils 21 and 22, the frequencies being sustained for the time interval between $t_1$ and $t_2$. The potentials produced during this time interval in receiving coils 24 and 25 are also illustrated as the corresponding portion of curves 24' and 25', respectively, of FIG. 4. As stated before, the Larmor precession frequencies have a definite relaxation time, the time depending on the particular paramagnetic substance being excited. Upon cessation of the driving potential at the time $t_2$, the precession of bodies 11 and 12 will continue, but, as is characteristic with resonance phenomena, will swing over from their driven frequency, determined by the frequency of oscillator 27, into their inherent resonant frequency as determined by the steady state fluxes to which they are individually subjected. The time of this change is not instantaneous, but occurs in a relatively short time after the removal of the driving potential.

Receiver coils 24 and 25 are connected to the input circuit of a detector 31 which presents, on its associated output conductor, leading to one input of a gate circuit 32, a frequency equal to the frequency difference between the frequencies presented by receiving coils 24 and 25. Inasmuch as bodies 11 and 12 are linked by different amounts of flux due to opposed coils 18 and 19, the frequency of the signals induced upon coils 24 and 25, after attainment of the resonant frequency during the relaxation time, will differ by an amount proportional to twice the flux produced by either of the coils 18 or 19. This is true since the flux from coil 18 subtracts a given amount from the flux of coil 14 for application to body 11, while the flux from coil 19 adds the same given amount to the flux applied to body 12. Since the flux produced by coils 18 and 19 is directly proportional to the current flowing therethrough, it is manifest that the output frequency of detector 31, at the magnetic resonant frequency of bodies 11 and 12, is directly proportional to the current flowing through the coils from the analogue potential source 17. Since the current, in turn, is directly proportional to the given analogue potential, it is apparent that the frequency of the output from detector 31, after assumption of resonant frequencies by bodies 11 and 12, is directly proportional to the magnitude of the analogue potential. Due to the invariant quality of this Larmor resonant precession frequency, as before noted, an extremely accurate and stable voltage or current to frequency conversion has thus been accomplished.

After the voltage to frequency conversion has been effected, the output signal from detector 31 is applied to a counting circuit for counting the cycles of the output signal occurring during a predetermined time interval to complete the analogue-to-digital conversion, since this count represents a digital number corresponding to the output frequency. In the embodiment shown in FIG. 3, in order to provide this count, it is desirable to wait until the frequency of the relaxation or decay signals from coils 24 and 25 is reached where the magnetic moments of each of the bodies 11 and 12 are precessing at their resonant magnetic frequency. Thus, the output of detector 31 should be counted only when the applied signal frequencies are indicative of the Larmor resonance of the two respective bodies.

The counting circuit structure includes a pulse generator 29 feeding its output pulses, occurring at predetermined intervals, into both the gate generator 28 and a delay line 34. Gate generator 28 may be a conventional single shot multivibrator which, upon receipt of a pulse, will produce an output gating signal whose duration is determined by certain of its own circuit parameters. The gating signal of gate generator 28 serves to trigger R-F oscillator 27 for the time interval between $t_1$ and $t_2$ in the manner previously described. The same pulse which actuated gate generator 28 is retarded or delayed for the time interval between $t_1$ to $t_3$ by delay line 34 and then is fed into another gate generator 35 similar to generator 28, for producing a gating pulse lasting for the time interval between $t_3$ and $t_4$ of FIG. 4. The gating pulse from generator 35 is applied to one input of a gate 32, the output of detector 31 being applied to a second input of gate 32. The gate serves to pass the output of the detector to a squaring circuit 37 connected to the output of gate 32. The output from gate 32 is indicated by curve 32' of FIG. 4. This sine wave is squared by circuit 37, differentiated by circuit 38, and the resulting pulses applied to the input of a counting register 39. Register 39 may be a conventional scale-of-two or binary counter chain, and records the number of input pulses presented thereto during the time interval between $t_3$ and $t_4$ on its output terminals 40 in the digital form of binary numbers.

The accuracy of the conversion is extremely high due primarily to the stability of the Larmor resonant frequency of the paramagnetic bodies 11 and 12. The uniformity of the flux fields produced by coils 14, 18, and 19 and their respective proportionality of flux output to the current flowing therethrough, are factors affecting the accuracy of the device. These factors may be minimized by proper design of the respective coils. Also, a greater conversion accuracy may be effected by counting the cycles of the output frequency produced by detector 31 for a longer period of time than that illustrated by way of example in FIG. 4, assuming that the signal amplitude has not decreased to the point where its cycles can no longer be counted. This is accomplished by rearranging the parameters of gate generator 35 so that a longer gating pulse will be produced thereby in order that a longer time interval will exist between $t_3$ and $t_4$ of FIG. 4. It is of course necessary that the time interval between $t_3$ and $t_4$, for any given application of this converter, remain constant to provide a proportional conversion for all analogue input voltage quantities.

As will be apparent to those skilled in the art, only one paramagnetic body need by employed, with corresponding omission of detector 31, if the range of resonant frequencies employed in the conversion is within such limits as may be readily counted. At the present time, counting registers of the type contemplated for use with this embodiment have been constructed by which it is possible to count up to several megacycles per second. However, since the usual frequency range of Larmor precession resonance varies from a few to over fifty megacycles, it is necessary, if the middle or upper frequency range of Larmor precession is to be used, to utilize the beat frequency principle illustrated in FIG. 3 in order to obtain an output of low enough frequency for ready counting in available counting registers.

FIG. 5 discloses another embodiment of an analogue-to-digital converter utilizing the phenomena of paramagnetic resonance for accomplishing the conversion. The precession induction unit 41, in this instance, consists of a coil 44 whose axis is aligned along the z-axis and which establishes a uniform flux field in the region of paramagnetic body 50 by reason of the current flowing through it from an analogue potential source 45. A subsidiary coil 48, whose axis is aligned with the axis of coil 44, is connected to audio frequency oscillator 49, and serves to weakly modulate the flux field enveloping paramagnetic body 50 from the main coil 44 with an audio frequency modulation envelope. The receiver coil 52, aligned along the y-axis is connected to a detector 53, whose output is amplified by an audio amplifier 54 and then fed into one input circuit of a mixer 55. A second input circuit of mixer 55 is connected to audio oscillator 49 and its output is connected to a variable frequency R-F oscillator 59 to control the frequency of oscillation thereof. The output of R-F oscillator 59 is connected to a transmitter coil 58 aligned along the x-axis and which serves to produce a driving field on the paramagnetic substance of body 50 to induce precession thereof.

Block 42, containing the elements thus far described, is, in effect, a self-controlled or locked-in oscillator operating at the Larmor resonant frequency at all times for all values of flux produced by coil 44. Its mode of operation is as follows:

The alternating flux field produced by coil 48 serves to amplitude modulate the total flux reaching body 50 from coil 44, and if the flux envelope is represented as curve 10 in FIG. 2, as applied to the resonant curve of the induction unit where the existing frequency of oscillator 59 is at a frequency corresponding to the average value of the curve 10, as indicated by $f_1$, then receiving coil 52 will have induced in it a modulated R-F potential as illustrated by curve 10' of FIG. 2, whose envelope is of the same audio frequency as that produced by oscillator 49. The magnitude and phase of curve 10' will vary in accordance with the point where curve 10 is applied on curve $e_o$ relative to the resonant frequency $f_R$, which, in turn, is determined by the output frequency $f_1$ of oscillator 59. After detection by detector 53 of the signal having waveform 10' and amplification by audio amplifier 54, the signal is applied to mixer 55 along with a signal from audio oscillator 49. Mixer 55 is utilized as a phase discriminator and produces a D.-C. frequency-difference potential on its output conductor which is a linear function of the amplitude of the signal from amplifier 54, the polarity of the potential being determined by the relative phase angle between the two input potentials to mixer 55. The D.-C. output potential is then applied to the variable frequency R-F oscillator 59 to control the frequency thereof. Oscillator 59 may be of the type having a reactance tube circuit determining the frequency of its oscillation, the reactance circuit being controlled by the input potential to thereby vary the output frequency. In the example illustrated in FIG. 2, the D.-C. output from mixer 55 due to potential 10' will change the frequency output of oscillator 59 until a point on the curve $e_o$ is reached where curve 10 of the flux modulation envelope swings equally on either side of the frequency designated by $f_R$, which is the paramagnetic resonant frequency of substance 50 under the given field produced by coil 44. When this point on the curve is reached, a zero D.-C. potential is produced by the mixer which does not further vary the frequency of oscillator 59. Under this condition, the frequency of oscillator 59 is set at the paramagnetic resonant frequency of body 50 for the given current in coil 44, and will automatically track in the manner explained to a new resonant frequency for any new current quantity flowing through coil 44. Unit 42 thus provides a self-tracking oscillator, which produces on an output conductor 60 coming from variable oscillator 59, a signal having a frequency directly proportional to the current flowing in leads 46 and 47 connected between the analogue potential source and coil 44.

The frequency of the output signal appearing on conductor 60 is counted for a predetermined time interval and the count thereof provides the analogue-to-digital conversion. The counting is accomplished by connecting conductor 60 to one input of a gate 32, the other input of gate 32 being connected to the output of a gate generator 35, of the type illustrated in FIG. 3. The input of gate generator 35 is, in turn, connected to pulse generator 63, and, upon receipt of a pulse therefrom, produces a gating pulse lasting for the predetermined time interval. This gating pulse opens gate 32 and allows the output signal from the tracking oscillator unit 42 to be passed therethrough. The signal is, in sequence, squared by a squaring circuit 37, differentiated by a differentiating circuit 38, and the resultant pulses applied to a counting register 39 of the type disclosed in FIG. 3. The final digital count is presented by the scale-of-two counter constituting counting register 39 on its output terminals 40 as a binary digital number corresponding to the potential output of source 45.

One significant difference in operation between the embodiment illustrated in FIGS. 3 and 5 is that the output from the induction unit 41 of FIG. 5 may be sampled for a longer time interval since its output oscillations may be sustained indefinitely for any sustained current input to its coil 44. The device of FIG. 3, on the other hand, is limited in the time that its output signal is produced by the relaxation time of the particular paramagnetic material utilized. Thus, the longer count made possible by the sustained output of the converter of FIG. 5 permits a greater accuracy of its conversion than is possible with the converter of FIG. 3.

As will be apparent to those skilled in the art, the unit according to FIG. 5 may be modified so that beat or difference frequencies for counting are obtained between two similar self-tracing oscillators correlated in a manner similar to that done for the two paramagnetic bodies in FIG. 3. In this manner, a higher precession resonance frequency may be employed by the self-tracking oscillators than that possible with the illustrated single oscillator if a conventional counter register is to be employed for presenting the digital output number.

Referring now to FIG. 6, there is shown an embodiment of this invention wherein a D.-C. signal voltage may be amplified. The D.-C. signal to be amplified is generated in D.-C. source 65, and is applied by conductors 46 and 47 to a magnetic resonance oscillator 42, identical in all respects to oscillator 42 as shown and described in connection with FIG. 5. Oscillator 42, in the manner described, produces an output signal whose frequency is directly proportional to the magnitude of the applied signal. This signal is applied over an output conductor 60 to a squaring and differentiating circuit 66 which produces, on its output conductor, recurring positive and negative pulses. These pulses are then applied to a clipping network 67 which removes the negative pulses and the remaining positive pulses are fed into a gate generator 89 of the type previously described in connection with FIG. 3. Upon receipt of each positive pulse, gate circuit 89 produces, on its output terminal, a positive gating signal lasting for a predetermined length of time. These positive gate signals are then fed into the grid circuit of a pentode tube 70 acting as a constant current device during its conduction period. The plate of pentode 70 is connected to B+ while its cathode is connected to ground through a paralleled high resistance 74 and large condenser 73. Upon receipt of each positive gate from gate generator 89, tube 70 will transfer an amount of charge to its cathode condenser 73 dependent upon its conduction period which, in turn, corresponds to the duration of the applied input pulse. A resistance 76 is connected between the cathode of pentode 70 and an output terminal 78 while a condenser 77 is connected between output terminal 78 and ground. Accordingly, the resistances 74 and 76 and condenser 77 behave as a filter to smooth out or average the charging increments placed on cathode condenser 73 during the tube's conduction periods, and the resultant potential on terminal 78 is essentially a D.-C. amplification of the original signal from source 65.

As will be apparent to those skilled in the art, the omission of the smoothing circuit elements, resistances 74, 76, and condenser 77, will result in an integrating circuit in which the charge on condenser 73 at any instant is indicative of the summation of conduction periods of pentode 70 as effected by the input gating signals applied thereto from the gating generator 89. In using the circuit of FIG. 6 as either an integrator or D.-C. amplifier, the invarient proportionality between the magnitude of input D.-C. potential and frequency of output of the magnetic induction insures an extremely accurate correlation between the output integrated or amplified signal, as the case may be, and the input signal over a wide variation of magnitude of the input signal.

In FIG. 7, there is illustrated another embodiment of this invention in which the Larmor precession phenomena of a paramagnetic substance is utilized to provide a constant output voltage. In this embodiment, a conventional power supply 81 producing a positive potential output is connected to the plate of a triode 82. The cathode of this triode is connected directly to ground and then serially through a standard resistance 84 and static coil 44 of induction unit 80 to the negative terminal of power supply 81. Induction unit 80 contains, in addition to static coil 44, a modulating coil 48 along the axis of coil 44 connected to audio oscillator 49, a receiver coil 52 along the y-axis connected through a detector 53 and an audio amplifier 54 to one input of a mixer 55, another input of mixer 55 being connected to the output of oscillator 49. In these respects, unit 80 is similar to unit 42 of FIG. 5. However, transmitter coil 58, along the x-axis, is coupled to a standard R-F oscillator 86, which produces a constant frequency R-F output signal, and the output of mixer 55 is connected to the grid of triode 82.

Broadly, the function of this unit 80 is to maintain the current through static coil 44 at a constant value such that the flux produced thereby intersecting paramagnetic body 50 maintains that body at precession resonance with respect to the output frequency of fixed frequency R-F oscillator 86. In other words, the current through coil 44 is maintained so that the resonant frequency of body 50 coincides with the standard fixed frequency output of R-F oscillator 86. This is accomplished by modulating the static field produced by coil 44 with a weak audio field produced by coil 48 connected to audio oscillator 49.

The modulated R-F output potential from receiver coil 52 is detected by detector 53 to produce the straight audio modulation frequency which is then amplified by audio amplifier 54, and applied to one input of mixer 55. The other input of mixer 55 is connected to the audio oscillator 49 and its output potential consists of a D.-C. potential whose polarity and magnitude vary with a direction and amount, respectively, determined by the difference between the paramagnetic resonant frequency associated with the particular amount of flux in coil 44 at any instant and the frequency of standard oscillator 86. The output of mixer 55 is conducted to the grid of triode 82 and serves to vary the plate current of the tube until the current through coil 44 reaches the point where the flux field produced thereby through body 50 is of such value as to resonate it at the identical frequency of standard oscillator 86. When this condition is reached, mixer 55 no longer produces an appreciable output signal and a stable operating point of the circuit is reached. This signifies that the current flowing through coil 44 is directly proportional to the frequency of standard oscillator 86, and this current, in passing serially through standard resistance 84, produces a corresponding voltage drop thereacross which is also directly related ot the frequency of standard oscillator 86. Thus, the potential at terminal 90 connected between standard resistance 84 and coil 44 will be an extremely stable one, and any deviation thereof will be primarily dependent upon the frequency deviation of frequency standard 86. Inasmuch as frequency standards are available which possess extremely stable frequency characteristics, a very stable voltage output is, by this invention, made possible.

A modification of the circuit of FIG. 7 is possible wherein resistance 84 may be omitted and coil 44 wound of a resistance material exhibiting small resistance variations with temperature. In such a modification, coil 44 would serve to establish the necessary flux path while the potential drop thereacross would indicate the standard voltage output of the device.

What is claimed as new is:

1. An analogue-to-digital converter for converting an analogue potential to a digital number, said converter comprising: first and second paramagnetic bodies; means for enveloping said first and second bodies with the same static magnetic field; a source of an analogue potential to be converted; a first and second analogue field coil, each of said field coils being electrically coupled to said analogue potential source and adapted to generate a magnetic field of an intensity proportional to said analogue potential, said field coils being disposed so that said fields are oriented in series aiding and series subtracting relationship, respectively, with respect to said static magnetic field; means for producing a radio-frequency magnetic field having a vector normal to said static field and enveloping said first and second bodies; means for selectively energizing said radio-frequency field for a predetermined period; means inductively coupled to said bodies for producing a signal whose frequency is equal to the frequency difference of the precession frequencies of said bodies, the frequency difference being caused by the influence of said analogue field coils upon said bodies in the presence of said static magnetic field; normally inoperative means conductively coupled to the last-named means for digitally counting the cycles of said frequency difference signal; and means coupled to said normally inoperative means for operating it for a predetermined time interval after occurrence of said predetermined period, the digital count presented by said normally inoperative means for said predetermined time interval representing the digital conversion of the analogue potential.

2. An analogue-to-digital converter for converting an analogue potential to a digital number, said converter comprising: first and second paramagnetic bodies; means for respectively enveloping said bodies with first and second static magnetic fields of equal strength; first means for enveloping said first body with a first subsidiary magnetic field representative of the analogue potential and opposed to said first static magnetic field; second means for enveloping said second body with a second subsidiary magnetic field representative of the analogue potential and aiding said second static magnetic field; a pulsed radio-frequency oscillator; means coupled to said radio-frequency oscillator for enveloping said first and second bodies with a high frequency magnetic field for a predetermined period to initiate precession of said bodies, the direction of said high-frequency magnetic field being at right angles to said first and second static magnetic fields, said first and second bodies precessing at first and second resonance precession frequencies, respectively, for a length of time after termination of said predetermined period; first and second receiver means positioned adjacent said first and second bodies, respectively, the precession of said first and second bodies inducing signals in said first and second receiver means, respectively, having the precession frequencies of said bodies; detector means; delay means coupled between said radio-frequency oscillator and said detector means, said detector means being so constructed and arranged as to combine the signals induced in said first and second receiver means to produce an output signal having a frequency equal to the frequency difference between the precession frequencies of said bodies, the frequency difference being caused by the influence of said first and second means for enveloping said bodies in the presence of said static magnetic field; frequency counting means coupled to said detector means for counting the number of cycles of a signal applied thereto and presenting the count in digital form; and means coupled to said detector means for applying to said frequency counting means the output signal of said detector means for a predetermined interval during said length of time, the count of said counting means for said predetermined interval being the digital conversion signal representative of the analogue potential.

3. An analogue-to-digital converter for converting an analogue potential to a digital number, said converter comprising: first and second paramagnetic bodies; a static coil energized by a direct current source for enveloping said bodies with a static magnetic field; a source of an analogue potential to be converted; a first and second analogue field coil, each of said field coils being electrically coupled to said analogue potential source, the first of said field coils being adapted to envelop said first body with a first subsidiary magnetic field opposed to said static magnetic field, and the second of said field coils being adapted to envelop said second body with a second subsidiary magnetic field aiding said static magnetic field; a pulsed radio-frequency oscillator; first and second radio-frequency oscillator coils coupled to said radio-frequency oscillator, each of said radio-frequency coils being oriented at right angles with respect to an axis passing through said static coil and said first and second field coils, said radio-frequency coils being disposed parallel with respect to each other and in close proximity to each of said paramagnetic bodies, said radio-frequency coils being adapted to envelop said first and second bodies with a high frequency magnetic field for a predetermined period to initiate precession of said bodies, the direction of said high frequency magnetic fields being at right angles to said static magnetic field and said subsidiary fields, said first and second bodies precessing at first and second resonance precession frequencies, respectively, for a length of time after termination of said predetermined period; a pulse generator coupled to said pulsed radio-frequency oscillator and being adapted to energize said pulsed radio-frequency oscillator for said predetermined period; detector means; delay means coupled between said pulse generator and said detector means, said delay means being adapted to delay the signal from said pulse generator for at least said predetermined period; gating means coupled between said delay means and said detector means, said gating means being adapted so as to present an output signal only upon the simultaneous occurrence of a signal from said delay means and said detector means; a first and second receiver coil positioned adjacent said first and second bodies, respectively, and being oriented at right angles with respect to the plane established by said field coils and said static and radio frequency coils, respectively, the precession of said first and second bodies inducing signals in said first and second receiver coils, respectively, said signals having the precession frequencies of said bodies, respectively, said detector means being so constructed and arranged as to combine the signals induced in said first and second receiver coils to produce an output signal having a frequency equal to the frequency difference between the precession frequencies of said bodies, the frequency difference between said bodies being caused by the influence of said first and second subsidiary magnetic fields in the presence of said static magnetic field; and frequency counting means coupled to said gating means and being adapted to count the number of cycles of a signal applied thereto and presenting the count in digital form, the count of said counting means for said predetermined interval being the digital conversion signal representative of the analogue potential.

References Cited in the file of this patent

UNITED STATES PATENTS

Re. 23,769     Varian _____ Jan. 12, 1954
2,589,494     Hershberger _____ Mar. 18, 1952

OTHER REFERENCES

Article entitled "A Proton-Controlled Magnetic Field Regulator" by M. E. Packard in "The Review of Scientific Instruments," vol. 19, No. 7 for July 1948, pp. 435–439.

UNITED STATES PATENT OFFICE
CERTIFICATE OF CORRECTION

Patent No. 3,014,210                      December 19, 1961

James O. Beaumont

It is hereby certified that error appears in the above numbered patent requiring correction and that the said Letters Patent should read as corrected below.

Column 2, line 26, for "than" read -- then --; column 3, line 23, for "illustrat-" read -- illustrating --; line 73, after "steady-state" insert -- flux --; column 4, line 20, for "themeslves" read -- themselves --; line 51, for "gate" read -- gating --; line 52, for "gating" read -- gate --; column 7, line 8, after "having" insert -- the --.

Signed and sealed this 16th day of October 1962.

(SEAL)
Attest:

ERNEST W. SWIDER
Attesting Officer

DAVID L. LADD
Commissioner of Patents